Patented May 29, 1951

2,554,846

UNITED STATES PATENT OFFICE 2,554,846

PREPARATION OF N,N' DIACYLDIAMINO-ALKANES

Otto Turinsky, Palatine, Ill., assignor to Armour and Company, Chicago, Ill., a corporation of Illinois No Drawing. Application November 1, 1945, Serial No. 626,166

10 Claims. (Cl. 260—404.5)

This invention relates to methods for the preparation of N,N'diacyldiaminoalkanes by reaction of amides and aldehydes.

In the process previously employed for condensing amides and aldehydes to prepare N,N' diacyldiaminoalkanes, the amide is dissolved in a suitable organic solvent such as glacial acetic acid or the like, and the aldehyde and also an acid catalyst added to the solution. After a period of from 1 to 4 hours, depending principally on the temperature and the preparations used, the reaction is completed and the condensation product is crystallized from the solution on cooling.

I have now discovered it is possible to conduct the reaction of the amide and the aldehyde in the absence of any organic solvent by employing certain catalysts, and when so performed the reaction is substantially more rapid and the process more efficient than the prior practice in which the solvent is used. To practice my improvement it is necessary to use as catalysts either inorganic acids or strong organic acids. The inorganic acids may be added as such or may be produced in situ by adding substances which in the reaction mixture yield inorganic acids.

In carrying out my process, I may add to the amide while in melted condition a small quantity of special acid catalyst or a substance which yields an inorganic acid catalyst, and then add the aldehyde. The reaction is immediate and is usually substantially completed in 5 to 10 minutes. The amide may be heated so as to maintain a temperature above its melting point in order to obtain adequate mixture of the reactant. Suitably, the reaction mixture may be maintained above the melting point of the reaction product until the reaction is complete. The reaction is exothermic and generally quite vigorous. I prefer to hold the reaction product at a temperature above its melting point for about 10 to 15 minutes so as to drive off any excess aldehyde. On cooling the product solidifies and may be used in treating textiles or for other purposes. The product is obtained in quantitative yields, is stable and does not yield aldehyde on heating. It is a particular advantage of my process that no separation or recovery of solvent is involved. Another advantage lies in the speed and completeness of the reaction.

As an amide I may use any saturated aliphatic amide such as acetamide, propyl amide, butyl amide, capric amide, lauric amide, palmitic amide, stearic amide, or any unsaturated aliphatic amide such as oleic amide or linoleic amide. Suitably, I can use the amides prepared from the acid mixtures obtained upon hydrolysis of natural oils such as soybean oil or linseed oil, or prepared from fractions of such acid mixtures. The amides may be primary, secondary or tertiary, though the reaction is found to be more rapid and generally more desirable in connection with the primary amides. The amides containing from 12 to 18 carbon atoms in an alkyl radical are very appropriate for use in my improved process.

The aldehyde used in the reaction may be any aliphatic aldehyde such as formaldehyde, acetaldehyde, or butyraldehyde. However, formaldehyde is preferred and may be introduced to the reaction mixture in any form, for example, as a gas or a polymer. I prefer to introduce it in the form of a paraformaldehyde. Formaldehyde gives a much more rapid reaction and for most purposes a more desirable product than the other aliphatic aldehydes.

As previously stated, the catalyst may be any inorganic acid, for example sulfuric acid, hydrochloric acid, or phosphoric acid. The following substances yield inorganic acids in the reaction mixture and are usable for this reason: Sulfur dioxide, sulfur trioxide, sulfur monochloride, thionyl chloride, aluminum chloride, phosphorous pentachloride, phosphorous trichloride, phosphorous pentoxide, phosphorous oxychloride, chlorine, silicon tetrachloride. When such substances are used there is an immediate production of an inorganic acid which serves as the catalyst in the amide and aldehyde reaction.

Also, I can use strong organic acids such as p-toluene sulfonic acid, oxalic acid, and chloracetic acid. Such organic acids are strong in the sense that they are highly ionized in water and are to be distinguished from the weakly ionized acids such as acetic or lactic acids which will not serve in the process of this invention.

The catalyst may be used in very small quantities, of the order of 0.1–0.2% of the reaction mixture. More may be used but to no special advantage. It is understood that the special acid catalysts are always used as catalysts and not in a quantity to give a solvent effect. The acid would have to be used at least in excess of 10% to be considered in any sense a solvent.

The reaction may be described generally by the following equation:

where R is an alkyl radical and $R_1$ is an alkyl radical or hydrogen. The aldehyde should preferably be in the approximate amount which is stoichiometrically required for reaction with the amide, although lesser amounts may be used which will mean only that some unreacted amide will remain in the product. Greater amounts of aldehydes may also be used but the excess should preferably be driven off after the reaction is completed. It is of course desirable not to have a large excess of aldehyde.

The product may be called N,N'diacyldiaminoalkane, and where the aldehyde used is formaldehyde the product may be called N,N' diacyldiaminomethane. The alkyl radical of the amide may contain such substituent groups as hydroxyl, halogen, carboxyl, and like groups which are inert toward the aldehyde under the conditions of the process, and it is understood that such prior substitution does not exclude the amide for use in my process.

Following are specific examples illustrating my invention.

Example 1

Commercial stearamide was recrystallized a number of times from toluene and ethyl alcohol until a white crystalline product melting at 105.5–106° C. was obtained. One-tenth mole (28.3 grams) of this amide was heated at 135–140° C. and 1 drop of 65% sulfuric acid solution was added with vigorous stirring to get a complete dispersion of the acid. Then 1.5 grams of paraformaldehyde (equivalent to 0.05 mole of gaseous formaldehyde) was added with stirring. A vigorous reaction of short duration took place and water was quantitatively evolved. The temperature was held at 150–155° C. for about fifteen minutes, when the odor of the formaldehyde was no longer present. The weight loss of 0.90 gram corresponded quantitatively to the water (0.05 mole) evolved in the formation of the reaction product. On cooling, a hard, white, waxy solid was obtained which was found to have a melting point of 148–150° C.

Example 2

A 2 mole quantity of commercial stearamide (567 grams) was heated to a temperature of 135–140° C. To this was added 0.4 cc. of 65% sulfuric acid as a catalyst and the mixture was stirred vigorously in order to insure thorough dispersion. Immediately and with stirring there was added 30 grams of paraformaldehyde (equivalent to 1 mole of gaseous formaldehyde). A vigorous reaction ensued and water was rapidly evolved, the amount of water corresponding closely to the calculated (1 mole) quantity. The temperature was maintained at 140–150° C. for about thirty minutes, when the odor of the formaldehyde was no longer present. The product formed (N,N'distearyldiaminomethane) was a hard, waxy, stable solid no darker than the original amide and melted at 132–135° C.

Example 3

N,N'dilauryldiaminomethane was prepared from 2 moles of commercial lauric amide and 1 mole of formaldehyde under the procedure given in Example 2. Slightly higher temperatures were employed to accommodate the higher melting point of the reaction product. The final product was a hard, waxy and stable solid melting at 146–150° C.

Example 4

N,N'diacetyldiaminomethane was prepared from 2 moles of acetamide and 1 mole of formaldehyde according to the procedure given under Example 2, slightly higher temperatures being employed to accommodate the higher melting point of the reaction product. The final product was a hard and stable solid melting at 165° C. This diacetyl product differed from the higher homologs prepared in Examples 2 and 3 in that it showed a tendency toward crystallinity. At room temperature it was harder than the higher members and was found to be readily soluble in water and ethyl alcohol.

Example 5

A 0.2 mole quantity of commercial stearamide (56 grams) was heated to a temperature of 135° C. To this was added 0.1 cc. of 65% sulfuric acid as a catalyst. The mixture was stirred vigorously to insure thorough dispersion. Acetaldehyde was bubbled through the mixture for thirty minutes while the temperature was maintained at 135° C. A fairly vigorous reaction of short duration, accompanied by the evolution of water, took place. The reaction mixture was then heated for one hour at 150° C. in order to free it from the odor of acetaldehyde. The N,N' diaminodistearylethane thus obtained was a waxy solid melting at 95–100° C.

The foregoing specific examples have been given for purposes of explanation only and are not to be taken in a limited sense, it being understood that the invention may be practiced in a great many ways, employing varying procedures, all within the scope of the invention.

I claim:

1. In a process for preparing N,N'diacyldiaminomethane, the step of reacting an aliphatic amide of a monobasic acid and formaldehyde at a temperature exceeding the melting point of the reaction product in the absence of organic solvents and in the presence of a catalyst selected from the group consisting of an inorganic acid and a strong organic acid.

2. A process as set forth in claim 1 wherein said catalyst is sulfuric acid.

3. A process as set forth in claim 1 wherein said amide contains an alkyl radical having from 12 to 18 carbon atoms.

4. A process as set forth in claim 1 wherein said amide is oleic amide.

5. A process as set forth in claim 1 wherein said amide is stearic amide.

6. A process as set forth in claim 1 wherein said amide is acetamide.

7. A process for preparing N,N'diacyldiaminomethane comprising mixing formaldehyde with an aliphatic amide of a monobasic acid at a temperature of at least 135° C. and in the absence of an organic solvent, and contacting this mixture with a catalyst selected from the group consisting of an inorganic acid and a strong organic acid.

8. A process for preparing N,N'diacyldiaminomethane comprising mixing formaldehyde with an aliphatic amide of a monobasic acid at a temperature of at least 135° C. in the absence of an organic solvent, contacting such mixture with a catalyst selected from the group consisting of an inorganic acid and a strong organic acid, maintaining the reaction product in melted condition until unreacted formaldehyde is driven off, and cooling the product to solidify it.

9. In a process for preparing N,N'diacyldiaminoalkane, the step of reacting an aliphatic amide of a monobasic acid and a lower alkyl aldehyde at a temperature exceeding the melting point of the reaction product in the absence of organic solvents and in the presence of a catalyst selected from the group consisting of an inorganic acid and a strong organic acid.

10. In a process for preparing N,N'diacyldiaminomethane, the step of mixing an aliphatic amide of a monobasic acid, a lower alkyl aldehyde, and a substance which is capable of yielding an inorganic acid in the mixture, said mixing step being performed in the absence of an organic solvent, and holding said reaction mixture at a temperature exceeding the melting point of the reaction product until reaction is complete.

OTTO TURINSKY.

REFERENCES CITED

The following references are of record in the file of this patent:

UNITED STATES PATENTS

| Number | Name | Date |
|---|---|---|
| 2,096,181 | Jahrstorfer et al. | Oct. 19, 1937 |
| 2,186,464 | Mauersberger | Jan. 9, 1940 |
| 2,279,497 | Sallman et al. | Apr. 14, 1942 |
| 2,365,813 | Gluesenkamp | Dec. 26, 1944 |
| 2,365,871 | Graenacher et al. | Dec. 26, 1944 |

FOREIGN PATENTS

| Number | Country | Date |
|---|---|---|
| 537,221 | Great Britain | June 13, 1941 |
| 538,608 | Great Britain | Aug. 11, 1941 |
| 541,071 | Great Britain | Nov. 12, 1941 |
| 782,330 | France | Mar. 11, 1935 |